United States Patent
Lomoelder et al.

(10) Patent No.: US 9,796,876 B2
(45) Date of Patent: Oct. 24, 2017

(54) COATING MATERIAL WITH HIGH SCRATCH RESISTANCE

(71) Applicants: Rainer Lomoelder, Muenster (DE); Hans Goerlitzer, Dortmund (DE); Markus Hallack, Schermbeck (DE); Tobias Unkelhaeusser, Herten (DE)

(72) Inventors: Rainer Lomoelder, Muenster (DE); Hans Goerlitzer, Dortmund (DE); Markus Hallack, Schermbeck (DE); Tobias Unkelhaeusser, Herten (DE)

(73) Assignee: Evonik Degussa GmbH, Essen (DE)

( * ) Notice: Subject to any disclaimer, the term of this patent is extended or adjusted under 35 U.S.C. 154(b) by 238 days.

(21) Appl. No.: 14/409,583

(22) PCT Filed: Jun. 17, 2013

(86) PCT No.: PCT/EP2013/062506
§ 371 (c)(1),
(2) Date: Dec. 19, 2014

(87) PCT Pub. No.: WO2013/189882
PCT Pub. Date: Dec. 27, 2013

(65) Prior Publication Data
US 2015/0191625 A1    Jul. 9, 2015

(30) Foreign Application Priority Data

Jun. 20, 2012  (EP) .................................... 12172681
Nov. 26, 2012  (EP) .................................... 12194204

(51) Int. Cl.
| | |
|---|---|
| *C08G 18/71* | (2006.01) |
| *C08G 18/77* | (2006.01) |
| *C08K 5/3435* | (2006.01) |
| *C08K 5/3475* | (2006.01) |
| *C09D 175/04* | (2006.01) |
| *C09D 175/06* | (2006.01) |

(52) U.S. Cl.
CPC ......... *C09D 175/06* (2013.01); *C08G 18/718* (2013.01); *C08G 18/778* (2013.01); *C08K 5/3435* (2013.01); *C08K 5/3475* (2013.01); *C09D 175/04* (2013.01)

(58) Field of Classification Search
CPC .. C09D 175/06; C09D 175/04; C08G 18/718; C08G 18/778; C08K 5/3435; C08K 5/3475
See application file for complete search history.

(56) References Cited

U.S. PATENT DOCUMENTS

| | | | |
|---|---|---|---|
| 6,251,985 B1 * | 6/2001 | Wamprecht | C08G 18/022 524/539 |
| 6,428,898 B1 | 8/2002 | Barsotti et al. | |
| 6,613,863 B2 | 9/2003 | Kohlstruk et al. | |
| 6,703,471 B2 | 3/2004 | Kohlstruk et al. | |
| 6,924,385 B2 | 8/2005 | Lettmann et al. | |
| 7,001,973 B2 | 2/2006 | Kohlstruk et al. | |
| 8,569,440 B2 | 10/2013 | Spyrou et al. | |
| 8,816,125 B2 | 8/2014 | Michalczak et al. | |
| 2003/0027921 A1 | 2/2003 | Speier et al. | |
| 2005/0245724 A1 * | 11/2005 | Horiguchi | C08F 283/06 528/425 |
| 2008/0265201 A1 | 10/2008 | Spyrou et al. | |
| 2008/0269415 A1 | 10/2008 | Spyrou et al. | |
| 2010/0092686 A1 | 4/2010 | Laryea et al. | |
| 2010/0168329 A1 | 7/2010 | Hoppe et al. | |
| 2010/0222540 A1 | 9/2010 | Raukamp et al. | |
| 2011/0059251 A1 * | 3/2011 | Poppe | C08G 18/2063 427/379 |
| 2013/0243962 A1 | 9/2013 | Lomoelder et al. | |
| 2013/0244043 A1 | 9/2013 | Lomoelder et al. | |
| 2013/0303042 A1 | 11/2013 | Schmidt et al. | |

FOREIGN PATENT DOCUMENTS

| | | |
|---|---|---|
| CN | 101952338 A | 1/2011 |
| DE | 10 2007 020404 | 10/2008 |
| EP | 1 273 640 | 1/2003 |

OTHER PUBLICATIONS

International Search Report dated Jan. 27, 2014 in PCT/EP13/062506 filed Jun. 17, 2013.

* cited by examiner

*Primary Examiner* — Patrick Niland
(74) *Attorney, Agent, or Firm* — Oblon, McClelland, Maier & Neustadt, L.L.P.

(57) ABSTRACT

The present invention relates to a coating material comprising at least one aliphatic or cycloaliphatic polyisocyanate having an NCO functionality of at least 2, preferably 2.8 to 6, optionally at least one binder, preferably a hydroxyl-containing binder, at least one adduct of an isocyanatotrialkoxysilane and a polyhydric alcohol, with more than 90, more preferably more than 95, most preferably more than 99 percent of the hydroxyl groups in the polyhydric alcohol having been converted by reaction with the isocyanatotrialkoxysilane, and less than 0.1 wt % of the isocyanate groups from the isocyanatotrialkoxysilane being reactive in the adduct, at least one catalyst selected from the group consisting of Lewis acids, phosphoric acid or phosphorous acid and esters thereof, blocked or non-blocked sulphonic acids, sulphuric acid, carboxylic acids having a melting point >60° C. and tetraalkylammonium carboxylates, optionally at least one auxiliary, preferably at least one further crosslinker, and/or adjuvant, and optionally organic solvents, and also to a process comprising providing, applying to a surface and curing the coating material, to a coating obtainable by curing the coating material, and to use of the coating material for coating a metal, glass, plastic or wood surface.

18 Claims, No Drawings

COATING MATERIAL WITH HIGH SCRATCH RESISTANCE

The present invention relates to a coating material comprising at least one aliphatic or cycloaliphatic polyisocyanate having an NCO functionality of at least 2, preferably 2.8 to 6, optionally at least one binder, preferably a hydroxyl-containing binder, at least one adduct of an isocyanatotrialkoxysilane and a polyhydric alcohol, with more than 90, more preferably more than 95, most preferably more than 99 percent of the hydroxyl groups in the polyhydric alcohol having been converted by reaction with the isocyanatotrialkoxysilane, and less than 0.1 wt % of the isocyanate groups from the isocyanatotrialkoxysilane being reactive in the adduct, at least one catalyst selected from the group consisting of Lewis acids, phosphoric acid or phosphorous acid and esters thereof, blocked or non-blocked sulphonic acids, sulphuric acid, carboxylic acids having a melting point >60° C. and tetraalkylammonium carboxylates, optionally at least one auxiliary, preferably at least one further crosslinker, and/or adjuvant, and optionally organic solvents, and also to a process comprising providing, applying to a surface and curing the coating material, to a coating obtainable by curing the coating material, and to use of the coating material for coating a metal, glass, plastic or wood surface.

Aliphatic polyurethane coatings based on 2-component systems are known for their outstanding profile of properties. On account of their high weathering stability and chemical stability, they find broad application, for example, as clearcoat materials in the automotive OEM finishing and refinish sectors, the aircraft finishing sector, and the coating of large vehicles.

A disadvantage of aliphatic polyurethane coating materials is their poor scratch resistance. This is manifested particularly in the case of vehicle clearcoats, which according to U.S. Pat. No. 5,137,972 must have been formulated for particularly high resistance with respect to acidic environmental factors. Even standard 2-component PU (polyurethane) paints have a scratch resistance which often no longer satisfies the requirements of the motor vehicle industry, meaning that they have to be modified, as with nanoparticles in accordance with U.S. Pat. No. 6,387,519, for example.

One possibility described in the literature for improving the scratch resistance of 2-component PU paints lies in the use of polyisocyanate crosslinkers, partially derivatized with secondary aminosilanes. In the case of heat curing, the coatings prove to be highly performing, allowing them already to be used in automotive OEM finishing.

Partially silanized polyisocyanates for scratch-resistant clearcoat materials are also known from EP-A 1273640. They are required to possess free NCO groups, in order to allow sufficiently rapid curing. Furthermore, the crosslinkers described therein are used in thermosetting coatings for motor vehicle finishing—that is, curing takes place at temperatures above 120° C.

A significant disadvantage of the highly scratch-resistant clearcoats based on reaction products of polyisocyanates and secondary aminosilanes is the comparatively high molecular weight of the crosslinker components relative to polyisocyanate crosslinkers of 2-component PU paints, resulting in a comparatively much higher viscosity for the components and hence in significantly lower solids contents and higher fractions of volatile solvents in the paint formulations for a given application viscosity.

The problem addressed by the present invention lies in the provision of a coating material which after curing, as a constituent of a coating on surfaces, or as a constituent of paint formulations, results in a high scratch resistance and chemical resistance on the part of the cured paint or the coating comprising the cured coating material.

A further problem on which the present invention is based lies in the provision of a coating material having a very high solids content.

These and other objects are achieved by the subject matter of the present application and particularly also by the subject matter of the accompanying independent claims, with embodiments arising from the dependent claims.

The problem on which the invention is based is solved in a first aspect by a coating material comprising
  A) at least one aliphatic or cycloaliphatic polyisocyanate having an NCO functionality of at least 2, preferably 2.8 to 6,
  B) optionally at least one binder, preferably a hydroxyl-containing binder,
  C) at least one adduct of an isocyanatotrialkoxysilane and a polyhydric alcohol,
     where preferably more than 90, more preferably more than 95, most preferably more than 99 percent of the hydroxyl groups in the polyhydric alcohol have been converted by reaction with the isocyanatotrialkoxysilane, and/or less than 0.1 wt % of the isocyanate groups from the isocyanatotrialkoxysilane are reactive in the adduct,
  D) at least one catalyst selected from the group consisting of Lewis acids, phosphoric acid or phosphorous acid and also the esters thereof, blocked or non-blocked sulphonic acids, sulphuric acid, carboxylic acids having a melting point >60° C. and tetraalkylammonium carboxylates,
  E) optionally at least one auxiliary selected from the group consisting of isocyanate-free crosslinkers, additives, stabilizers and adjuvants, and
  F) optionally organic solvents.

In a first embodiment of the first aspect, the problem is solved by a coating material where the fraction of A), based on the sum of the components A), B) and C), is 15 to 40 weight percent.

In a second embodiment of the first aspect, which also represents an embodiment of the first aspect, the problem is solved by a coating material where the fraction of B), based on the sum of the components A), B) and C), is 20 to 60 weight percent.

In a third embodiment of the first aspect, which also represents an embodiment of the first and second aspects, the problem is solved by a coating material where the fraction of C), based on the sum of the components A), B) and C), is 10 to 70 weight percent.

In a fourth embodiment of the first aspect, which also represents an embodiment of the first to third aspects, the problem is solved by a coating material where the at least one aliphatic or cycloaliphatic polyisocyanate is prepared by oligomerization of a diisocyanate,
the diisocyanate being preferably selected from the group consisting of isophorone diisocyanate, hexamethylene diisocyanate, 4,4'- and/or 2,4'-diisocyanatodicyclohexylmethane, 2-methylpentane diisocyanate, 2,4,4-trimethylhexamethylene diisocyanate and 2,2,4-trimethylhexamethylene diisocyanate.

In a fifth embodiment of the first aspect, which also represents an embodiment of the first to fourth aspects, the problem is solved by a coating material where the at least one binder is selected from the group consisting of hydroxyl-containing polyesters, polyethers, polyacrylates, polycarbonates and polyurethanes,
and where the binder has an OH number of 20 to 500 mg KOH/g and an average molar mass of 250 to 6000 g/mol.

In a sixth embodiment of the first aspect, which also represents an embodiment of the first to fifth aspects, the problem is solved by a coating material where the adduct of an isocyanatotrialkoxysilane and polyhydric alcohol is an adduct from the reaction of an isocyanatotrialkoxysilane, which represents an alkyl radical substituted by at least one $Si(OR_1)(OR_2)(OR_3)$ group and an isocyanate group, and a polyhydric alcohol,
where the alkyl radical substituted by at least one $Si(OR_1)(OR_2)(OR_3)$ group and an isocyanate group is a linear or branched alkane having 1 to 4 carbon atoms,
and where $R_1$, $R_2$ and $R_3$, in each case and independently of one another, are selected from the group consisting of methyl, ethyl, propyl and butyl.

In a seventh embodiment of the first aspect, which also represents an embodiment of the first to sixth aspects, the problem is solved by a coating material where the isocyanatotrialkoxysilane is a compound of the formula (I),

$$OCN-(CH_2)_n-Si(OR_1)(OR_2)(OR_3) \qquad (I),$$

where n is 1, 2, 3, 4, 5 or 6, preferably 3,
and where $R_1$, $R_2$ and $R_3$, in each case and independently of one another, are selected from the group consisting of methyl, ethyl and propyl, and are preferably each methyl.

In an eighth embodiment of the first aspect, which also represents an embodiment of the first to seventh aspects, the problem is solved by a coating material where the coating material is curable at 10 to 200° C., preferably 20 to 160° C.

In a ninth embodiment of the first aspect, which also represents an embodiment of the first to eighth aspects, the problem is solved by a coating material where the coating material is a non-aqueous coating material.

In a tenth embodiment of the first aspect, which also represents an embodiment of the first to ninth aspects, the problem is solved by a coating material where the polyhydric alcohol in the adduct C) is a non-cyclic polyhydric alcohol to an extent of at least 75%, preferably at least 90%, more preferably at least 95%.

In a second aspect, the problem on which the invention is based is solved by a process comprising the steps of
a) providing the coating material according to any of Claims 1 to 10,
b) applying the coating material to a surface to be coated, and
c) curing the coating material.

In a first embodiment of the second aspect, the problem is solved by a process where the temperature in step c) is 10 to 200° C., preferably 20 to 160° C.

In a third aspect, the problem on which the invention is based is solved by a coating obtainable by curing the coating material according to the first aspect or an embodiment thereof or by the process according to the second aspect or an embodiment thereof.

In a fourth aspect, the problem on which the invention is based is solved by a metal, glass, plastic or wood surface comprising the coating according to the third aspect.

In a fifth aspect, the problem on which the invention is based is solved by a primer, tie coat, topcoat or clearcoat, preferably as a constituent of a topcoat or clearcoat in a multi-coat paint finish in the context of vehicle finishing, comprising the coating material according to the first aspect or an embodiment thereof.

In a sixth aspect, the problem on which the invention is based is solved by the use of the coating material according to the first aspect or an embodiment thereof for coating a metal, glass, plastic or wood surface.

The present invention is based on the surprising finding by the inventors that the use of an adduct of an isocyanatotrialkoxysilane and a polyhydric alcohol as part of a coating material leads, after crosslinking by a polyisocyanate, to the formation of a coating which exhibits advantageous physical properties relative to conventional coatings, in particular a particularly high scratch resistance and chemical resistance and a high resistance towards overbake yellowing. The coating material also has, surprisingly, a particularly high solids content.

The coating material of the invention consists preferably substantially of components A), B), C), D) and E). In one preferred embodiment this means that the sum of the components A), B), C), D) and E) in the sequence of increasing preference makes up at least 45, 50, 55, 60, 65, 70, 75, 80, 85, 90, 92, 94, 96, 98 or 99 weight percent of the coating material.

In one preferred embodiment, the coating material of the invention is a non-aqueous coating material. In one particularly preferred embodiment, the term "non-aqueous", as used herein, means that the coating material of the invention, based on the sum of the components A), B), C), D) and E), has a water fraction of not more than 3 weight percent, preferably not more than 1 weight percent. In a most preferred embodiment, the coating composition of the invention is free of water.

The aliphatic or cycloaliphatic polyisocyanate A) used as crosslinker component comprises at least one aliphatic and/or cycloaliphatic polyisocyanate having an NCO functionality of at least 2, preferably 2 to 6, more preferably from 2.8 to 6, most preferably 2 to 4. In a preferred embodiment the term "NCO functionality" as used herein refers to the number of reactive NCO substituents possessed on average by the molecule in question, preferably the crosslinker component A).

The polyisocyanate used in accordance with the invention may be any aliphatic, cycloaliphatic and/or (cyclo)aliphatic diisocyanate. In one preferred embodiment the term "(cyclo) aliphatic diisocyanate" as used herein means that in a molecule there are present simultaneously NCO groups bonded to a ring and NCO groups bonded to an aliphatic radical, as is the case, for example, for isophorone diisocyanate. In one preferred embodiment the term "cycloaliphatic diisocyanate" as used herein refers to a diisocyanate which only has NCO groups bonded directly on the cycloaliphatic ring, an example being diisocyanatodicyclohexylmethane ($H_{12}MDI$).

Aliphatic diisocyanates suitable for use as polyisocyanate A) include a linear or branched alkylene radical having preferably 3 to 16 carbon atoms, more preferably 4 to 12 carbon atoms. Suitable cycloaliphatic or (cyclo)aliphatic diisocyanates include a cycloalkylene radical having preferably 4 to 18 carbon atoms, more preferably 6 to 15 carbon atoms. Examples of suitable diisocyanates or polyisocyanates include cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyloctane 1,8-diisocyanate (TIN), decane diisocyanate and triisocyanate, undecane diisocyanate and triisocyanate, dodecane diisocyanates and triisocyanates. Likewise suitable are 4-methylcyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate and/or 1,4-diisocyanato-4-methylpentane.

The diisocyanate used as polyisocyanate is preferably selected from the group consisting of isophorone diisocyanate (IPDI), hexamethylene diisocyanate (HDI), diisocyanatodicyclohexylmethane ($H_{12}$MDI), 2-methylpentane diisocyanate (MPDI), 2,2,4-trimethylhexamethylene diisocyanate/2,4,4-trimethylhexamethylene diisocyanate (TMDI) and norbornane diisocyanate (NBDI). Particularly preferred for use are IPDI, HDI, TMDI and/or $H_{12}$MDI, with IPDI, $H_{12}$MDI and/or HDI representing the most preferred polyisocyanates.

Particular preference is given to using polyisocyanates which can be prepared from the stated diisocyanates or mixtures thereof by linking by means of urethane, allophanate, urea, biuret, uretdione, amide, isocyanurate, carbodiimide, uretonimine, oxadiazinetrione or iminooxadiazinedione structures. Polyisocyanates of these kinds are available commercially, an example being VESTANAT HT 2500 L. Particularly suitable are isocyanurates, especially those of IPDI and/or HDI. Such polyisocyanates may optionally have been additionally chain-extended or branched with difunctional or polyfunctional, H-acidic components, such as diols or polyols and/or diamines or polyamines, for example. Those whose use is preferred in accordance with the invention are freed from residual monomers by distillative removal, so that the diisocyanate residual monomer content is <0.5 wt %.

For the purposes of the present invention, any desired mixtures of the above-described diisocyanates and/or polyisocyanates may be used.

Component A) is included in the coating composition of the invention at 5 to 50 weight percent, preferably 15 to 40 weight percent, based on the sum of the components A), B) and C). For example, A), based on the sum of the components A), B) and C), is present at 50 weight percent in the coating material of the invention if there are 25 g of A), 12.5 g of B) and 12.5 g of C). The molar ratio of the isocyanate groups of component A) to the OH groups of component B) is in one preferred embodiment 0.3:1 to 2:1, more preferably 0.5:1 to 1.5:1 and most preferably 0.7:1 to 1.3:1.

The coating material of the invention comprises as component B) at least one binder. Suitable in principle as binders are all kinds of binders known to the skilled person, including, for example, binders which are thermoplastic, in other words not crosslinkable, which customarily have an average molecular weight >10 000 g/mol. Preferred binders, however, are those which possess at least one, but preferably more than one, reactive functional group having at least one acidic hydrogen atom, examples being hydroxyl or primary or secondary amine groups. Suitable binders of the stated kind have, for example, at least one, but preferably two or more, hydroxyl group(s). Further suitable functional groups of the binder are trialkoxysilane functionalities, for example.

As binders with functional groups, preference is given to using hydroxyl-containing polyesters, polyethers, polyacrylates, polycarbonates and polyurethanes having an OH number of 20 to 500 mg KOH/g and an average molar mass of 250 to 6000 g/mol. Particular preference in the context of the present invention is given to using hydroxyl-containing polyesters or polyacrylates having an OH number of 50 to 250 mg KOH/g and an average molecular weight of 500 to 6000 g/mol as binder components. The hydroxyl number (OH number, OHN) is determined in accordance with DIN 53240-2. In the case of that method, the sample is reacted with acetic anhydride in the presence of 4-dimethylaminopyridine as catalyst, with the hydroxyl groups being acetylated. For each hydroxyl group, this produces one molecule of acetic acid, while the subsequent hydrolysis of the excess acetic anhydride yields two molecules of acetic acid. The consumption of acetic acid is determined by titrimetry from the difference between the main value and a blank value, which is to be carried out in parallel. The molecular weight is determined by means of gel permeation chromatography (GPC). The samples are characterized in tetrahydrofuran as eluent in accordance with DIN 55672-1.

Hydroxyl-containing (meth)acrylic copolymer used as binder may be resins having a monomer composition of the kind described, for example, in WO 93/15849 (page 8, line 25 to page 10, line 5). In that case the acid number of the (meth)acrylic copolymer, to be set through proportional use of (meth)acrylic acid as monomer, ought to be 0 to 30, preferably 0 to 15 mg KOH/g. The number-average molar weight (determined by gel permeation chromatography against a polystyrene standard) of the (meth)acrylic copolymer is preferably 2000 to 20 000 g/mol; the glass transition temperature is preferably −40° C. to 60° C. The hydroxyl content of the (meth)acrylic copolymers for use in accordance with the invention, to be set through proportional use of hydroxyalkyl (meth)acrylates, is preferably 20 to 500 mg KOH/g, more preferably 50 to 250 mg KOH/g.

Polyester polyols suitable as binders in accordance with the invention are resins having a monomer composition composed of dicarboxylic and polycarboxylic acids and of diols and polyols, as described in WO 93/15849. Polyester polyols used may also be polyadducts of caprolactone with low molecular mass diols and triols, of the kind obtainable under the designation CAPA® (Perstorp), for example. The arithmetically determined number-average molar weight is preferably 500 to 5000 g/mol, more preferably 800 to 3000 g/mol; the average functionality is preferably 2.0 to 4.0, more preferably 2.0 to 3.5.

As urethane- and ester-group-containing polyols for use in accordance with the invention as binders, those employed include in principle those of the kind as described in EP 140 186. Preference is given to using polyols containing urethane and ester groups that are prepared using HDI, IPDI, trimethylhexamethylene diisocyanate (TMDI) or dicyclohexylmethane diisocyanate ($H_{12}$MDI). The number-average molar weight is preferably 500-5000 g/mol; the average functionality lies more particularly in the range of 2.0-3.5.

Trialkoxysilane-functional binders as well are suitable for use as component B). Resins of this kind may be obtained by copolymerization of acrylate or methacrylate monomers with acryloyl- or methacryloyl-functional alkyltrialkoxysilane derivatives (e.g. Dynasylan MEMO from Evonik Industries AG), as described in WO 92/11328, for example. An alternative synthesis pathway is that of the derivatization of hydroxyl-containing polyethers, polyesters, polycarbonatediols or polyacrylates with isocyanatopropyltrialkoxysilane, as is described in Examples 3 and 4 of WO 2008/131715, for example.

Of course, mixtures of the above-described binders may also be used. Preferred binders are hydroxyl-containing polyesters and polyacrylates, alone or in mixtures.

The fraction of B) in the coating material of the invention is preferably 10 to 80 weight percent, based on the sum of the components A), B) and C), more preferably 20 to 60 weight percent.

The mixing ratio of components A) and B) is determined by the equivalent weight in respect of OH and NCO functionality. The stoichiometric OH:NCO ratio here is preferably 0.5:1 to 1.5:1, more preferably 0.7:1 to 1.3:1.

The at least one essential component C) of the coating material of the invention is an adduct of an isocyanatotrialkoxysilane and a polyhydric alcohol, with more than 90, more preferably more than 95, most preferably more than 99 percent of the hydroxyl groups in the polyhydric alcohol being converted by reaction with the isocyanatotrialkoxysilane, and less than 0.1 wt % of the isocyanate groups from the isocyanatotrialkoxysilane being reactive in the adduct. In one preferred embodiment, the term "polyhydric alcohol" as used herein refers to an organic compound having at least two hydroxyl groups, which are preferably each covalently bonded to a carbon atom. Especially suitable are aliphatic branched diols or polyols. The polyhydric alcohol preferably has a molecular weight of 62 to 314 g/mol, more preferably of 90 to 206 g/mol. Mixtures of different polyhydric alcohols may also be used for preparing the adduct. In one preferred embodiment, the polyhydric alcohol is selected from the group consisting of ethylene glycol, 1,2-propanediol, 1,3-propanediol, 1,4-butanediol, 1,5-pentanediol, 1,6-hexanediol, 1,10-decanediol, 1,12-dodecanediol, glycerol, isosorbitol, isomannitol, isoiditol, 2,2,4-trimethylhexane-1,6-diol and 2,4,4-trimethylhexane-1,6-diol, alone or as any desired mixtures of these isomers, 2,2-dimethylbutane-1,3-diol, 2-methylpentane-2,4-diol, 3-methylpentane-2,4-diol, 2,2,4-trimethylpentane-1,3-diol, 2-ethylhexane-1,3-diol, 2,2-dimethylhexane-1,3-diol, 3-methylpentane-1,5-diol, 2-methylpentane-1,5-diol, 2,2-dimethylpropane-1,3-diol (neopentyl glycol), neopentyl glycol hydroxypivalate, polyethylene glycol, polypropylene glycol, sorbitol, pentaerythritol, 1,1,1-trimethylolpropane, 3(4), 8(9)-bis(hydroxymethyl)tricyclo[5.2.1.0²,⁶]decane (Dicidol) and/or 2,2-bis(4-hydroxycyclohexyl)propane. Used with particular preference are 1,1,1-trimethylolpropane, 3 methylpentane-1,5-diol, neopentyl glycol, 2,2,4-trimethylhexane-1,6-diol and 2,4,4-trimethylhexane-1,6-diol, alone or as any desired mixtures of these isomers, and/or neopentyl glycol hydroxypivalate. The stated compounds may each be used alone or in the form of their mixtures. One most preferred embodiment uses 2,2,4-trimethylhexane-1,6-diol and 2,4,4-trimethylhexane-1,6-diol alone or as mixtures of these isomers in any desired proportion.

As polyhydric alcohol it is also possible, additionally, for up to a fraction of 40 weight percent of further diols and/or polyols to be present in the coating material of the invention, and these may be low molecular mass compounds and/or hydroxyl-containing polymers.

It is preferred in accordance with the invention for the polyhydric alcohol in the adduct C) to be a non-cyclic polyhydric alcohol to an extent, in order of increasing preference, of at least 75, 80, 85, 90, 95% or 99%. This means that the corresponding percentage of the molecules of the polyhydric alcohol that are present in the adduct are non-cyclic. In one preferred embodiment, the term "non-cyclic" as used herein covers any structural constituent which has no hydrocarbon in ring form, with or without heteroatoms, as a structural constituent.

Among low molecular mass compounds, suitability as polyhydric alcohols for preparing component C) is further possessed by oligomeric diols such as, for example, polypropylene glycols, polybutylene glycols, diethylene, dipropylene, triethylene and tetraethylene glycol. Suitable polyfunctional diols with n>2 are glycerol, hexanediol, hexane-1,2,6-triol, butane-1,2,4-triol, tris($\beta$-hydroxyethyl) isocyanurate, mannitol or sorbitol. These components may be used alone or as mixtures.

Additionally suitable as polyhydric alcohols for preparing component C) are hydroxyl-containing polymers such as polyesters, polyethers, polyacrylates, polycarbonates and polyurethanes having an OH number of 20 to 500 mg KOH/gram and an average molar mass of 250 to 6000 g/mol, as additional polyhydric alcohols. Particularly preferred are hydroxyl-containing polyesters and/or polyacrylates having an OH number of 20 to 150 mg KOH/gram and an average molecular weight of 500 to 6000 g/mol. The hydroxyl number (OHN) is determined in accordance with DIN 53240-2.

It is also possible, furthermore, to use mixtures of the abovementioned polymers or mixtures with monomeric or oligomeric diols or polyols as additional polyols.

In one preferred embodiment, the isocyanatotrialkoxysilane used in preparing component C) is a compound which has an alkyl radical substituted by at least one $Si(OR_1)(OR_2)(OR_3)$ group and by an isocyanate group, the alkyl radical being an at least doubly substituted linear or branched alkane having 1 to 4 carbon atoms. In one particularly preferred embodiment, $R_1$, $R_2$ and $R_3$ are the same and are either methyl or ethyl. Suitability as isocyanatotrialkoxysilane is possessed by, for example, 3-isocyanatopropyltrimethoxysilane, 3-isocyanatopropyltriethoxysilane, 3-isocyanatopropyltriisopropoxysilane, 2-isocyanatoethyltrimethoxysilane, 2-isocyanatoethyltriethoxysilane, 2-isocyanatoethyltriisopropoxysilane, 4-isocyanatobutyltrimethoxysilane, 4-isocyanatobutyltriethoxysilane, 4-isocyanatobutyltriisopropoxysilanes, isocyanatomethyltrimethoxysilane, isocyanatomethyltriethoxysilane and/or isocyanatomethyltriisopropoxysilane.

In accordance with the invention, with a view to component C), it is particularly preferred for more than 90, more preferably more than 95, most preferably more than 99 percent of the hydroxyl groups in the polyhydric alcohol to be converted by reaction with the isocyanatotrialkoxysilane, and/or for less than 0.1 wt % of the isocyanate groups from the isocyanatotrialkoxysilane to be reactive in the adduct. For less than 0.1 wt % of the isocyanate groups from the isocyanatotrialkoxysilane to be reactive in the adduct means, in one preferred embodiment, that in the adduct more than 99.9 wt % of the isocyanate groups originating from the isocyanatotrialkoxysilane are not present in a free reactive form, but instead reacted with a reactive group, as for example a hydroxyl group, and are no longer available for further reactions with reactive groups, preferably hydroxyl groups. In one more preferred embodiment, less than 0.05 wt % of the isocyanate groups from the isocyanatotrialkoxysilane are reactive in the adduct, and in a most preferred embodiment less than 0.01 wt %. For the skilled person it is easily possible as part of routine experiments to design the reaction conditions when preparing the adduct in such a way that this feature is achieved. A particularly significant factor in preparing the adducts of the invention from polyhydric alcohol and isocyanatotrialkoxysilane is the stoichiometric ratio of OH groups to NCO groups in the reactants. The ratio of OH:NCO in the starting components for preparing the adduct is preferably 1.1:1 to 1:1. The skilled person, from the prior art and as part of his or her art knowledge, is also aware of methods by which the number of reactive NCO groups may be determined.

The preparation of the adducts of the invention as component C) takes place in general without solvent or using non-protic solvents, and the reaction may take place batchwise or continuously. The reaction may be operated at room temperature, in other words at temperatures in the range from 20 to 25° C., though preferably higher temperatures are used, in the range from 30 to 150° C., more particularly in the range from 40 to 100° C. To accelerate the reaction it is possible with advantage to use catalysts which are known within urethane chemistry, such as Sn, Bi, Zn and other metal carboxylates, tertiary amines such as, for example, 1,4-diazabicyclo[2.2.2]octane (DABCO), triethylamine, etc. The reaction is carried out preferably in the absence of water.

The coating material of the invention is a two-component system. Here it is possible for component C) to be added not only to the paint component A), the polyisocyanate crosslinker, but also to the paint component B), the binder. Preferably, however, component C) is admixed to the polyisocyanate crosslinker (component A).

Component C) is included in the coating material of the invention at 10 to 90%, preferably at 10 to 70%, based on the sum of the components A), B) and C).

Catalyst D) is included in the coating material of the invention, in one preferred embodiment, in an amount of 0.1 up to 5 weight percent, preferably 0.2 to 3 weight percent, based on the sum of the components A), B) and C). For example, D) is present in an amount of 3 weight percent if components A), B) and C) together make up 100 g of the coating material and this material additionally contains 3 g of D).

Catalysts D) used may be organic carboxylic acids having a melting point >60° C. Examples of suitable carboxylic acids are, in particular, salicylic acid, benzoic acid, citric acid, phthalic acid, terephthalic acid, isophthalic acid, dodecanoic acid, 1,12-dodecanedioic acid and/or ascorbic acid. Preference is given to using salicylic acid, citric acid or benzoic acid, and mixtures of the stated carboxylic acids may also be employed.

Catalyst D) used may also be a tetraalkylammonium carboxylate. Examples thereof are tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and/or tetrabutylammonium benzoate. The stated tetraalkylammonium carboxylates may be added alone or in mixtures.

As catalyst D) it is also possible to use metal complexes with chelate ligands. The chelate ligands are organic compounds having at least two functional groups which are able to coordinate to metal atoms or metal ions. Use may be made, for example, of the aluminium- and zirconium-chelate complexes, as described in U.S. Pat. No. 4,772,672 A, for example, as catalyst. Preferred metal chelates are those based on aluminium, zirconium, titanium and/or boron, such as aluminium ethyl acetoacetate and/or zirconium ethyl acetoacetate.

Further suitable as catalyst D) are aluminium, zirconium, titanium and/or boron alkoxides and/or esters thereof.

As catalyst D) it is also possible to catalyse the urethane reaction using catalysts which have proved their worth within the field of PU technology, examples being organic Sn(IV), Sn(II), Zn and Bi compounds or tertiary amines. Catalysts of these kinds for urethane reactions are used in accordance with the invention, however, only in blends with other catalysts of the invention.

As catalyst D) it is also possible to use a phosphorus-containing catalyst, preferably a phosphorus- and nitrogen-containing catalyst. Mixtures of two or more different catalysts may also be used here. Examples of suitable phosphorus-containing catalysts are substituted phosphonic diesters and diphosphonic diesters, preferably from the group consisting of acyclic phosphonic diesters, cyclic phosphonic diesters, acyclic diphosphonic diesters and cyclic diphosphonic diesters. Catalysts of these kinds are described in DE-A 102005045228, for example.

As catalyst D) it is also possible with preference to use an amine-blocked phosphoric ester and with particular preference amine-blocked ethylhexyl phosphate and amine-blocked phenyl phosphate. Examples of amines with which the phosphoric esters are blocked are, in particular, tertiary amines, as for example triethylamine. Particularly preferred for use for blocking the phosphoric esters are tertiary amines which exhibit high catalyst activity at curing temperatures of 100 to 160° C. Certain amine-blocked phosphoric acid catalysts are also available commercially (e.g. Nacure products from King Industries). An example of a particularly suitable catalyst is that based on an amine-blocked partial ester of phosphoric acid, under the designation Nacure 4167 from King Industries.

Also possible for use as catalyst D) are organic sulphonic acids in non-blocked or blocked form. A suitable sulphonic acid is in principle any organic sulphonic acid, preference being given to p-toluenesulphonic acid and dodecylbenzenesulphonic acid. For coating systems which crosslink thermally, i.e. above 100° C., these sulphonic acids, in accordance with the invention, may also be employed preferably in amine-neutralized form. Also possible for use in accordance with the invention are latent, non-ionogenic sulphonic acid derivatives which release sulphonic acids only at above 100° C., such as adducts of sulphonic acids with epoxide-containing components, for example, as described in DE A 23 56768.

Salts of trifluoromethanesulphonic acid (triflates) as well are suitable sulphonic acid-based catalysts.

The catalyst D) in the coating materials of the invention may consist solely of the abovementioned alternatives, although any desired mixtures of the catalysts may also be used.

The coating material of the invention may further comprise auxiliaries and/or adjuvants E) known in coating technology, such as stabilizers, including light stabilizers, catalysts, additional crosslinkers, fillers, pigments, flow control agents or rheological assistants, such as sag control agents, for example, microgels or pyrogenic silicon dioxide, or else nanoparticles, as described in EP 1204701 B1, for example, in typical concentrations. Component E) may further comprise additional crosslinkers as known within coatings chemistry, which are used, for example, in the form of melamine resins, benzoguanamine resins, carbamate-functional components or blocked polyisocyanates. If necessary, inorganic or organic colour and/or effect pigments customary in coating technology may also be incorporated in component E) of the coating materials of the invention.

In one preferred embodiment, the coating material of the invention is a pigment-free system, in other words a clearcoat system. Component E) in this case may be included in the coating material of the invention preferably in an amount of 0.5 up to 8 weight percent, more preferably 1 to 6 weight percent, based on the sum of the components A), B) and C). Component E) is present, for example, in an amount of 6%, based on the sum of the components A), B) and C), when the coating material, i.e. the sum of components A), B), C), D), E) and F), has a total weight of 110 g, with the sum of components A), B) and C) here being 100 g, the amount of E) being 6 g, and the amount of D) and F) being in each case 2 g.

In another preferred embodiment, the coating material of the invention is a coloured coating system. Pigments and fillers as component E) may in this case be included in the coating material of the invention in an amount from 10 to 200 weight percent, based on the sum of the components A), B), and C). For example, component E) is present in an amount of 200 weight percent, based on the sum of the components A), B) and C), if the coating material, i.e. the sum of the components A), B), C), D), E) and F), has a total weight of 110 g, with the sum of components A), B) and C) being 30 g, the amount of E) being 60 g and the amount of D) and F) being 10 g in each case.

The coating material of the invention may further comprise organic solvents as component F). Suitable solvents are, for example, ketones, alcohols, esters, or aromatics.

Component F) is included in the coating material of the invention preferably in amounts from 20 up to 150 weight percent, more preferably 30 to 60 weight percent, based on the sum of the components A), B) and C).

The respective fractions of the components A), B), C), D), E) and F) are selected in their entirety such that the weight fractions add up to 100 weight percent.

The coating materials of the invention are produced by mixing of the components described above. The mixing may take place by means of mixers known to the skilled person, for example batchwise in stirred containers, dissolvers, bead mills, roll mills, etc., or else continuously using static mixers or the like.

The coating materials of the invention are produced by mixing of the components described above. The mixing may take place by means of mixers known to the skilled person, for example batchwise in stirred containers, dissolvers, bead mills, roll mills, etc., or else continuously using static mixers, for example.

The present invention is further illustrated by the following figures and non-limiting examples, from which further features, embodiments, aspects and advantages of the present invention may be taken.

EXAMPLES

Unless otherwise indicated, the quantity figures in percent in the examples are given by weight.

Example 1: Preparation of an Adduct of Isocyanatosilane and Trimethyihexanediol (Component C of the Inventive Coating Composition)

27.4 g of an isomer mixture (approximately 50/50) of 2,2,4- and 2,4,4-trimethylhexanediol are charged to a 250 ml 3 necked flask and admixed with 0.2 g of dibutyltin dilaurate (DBTDL) with stirring. Under a continual stream of nitrogen, the mixture is heated to 60° C. in a water bath. Subsequently, with stirring, 72.4 g of 3-isocyanatopropyltrimethoxysilane are added dropwise at a rate such that the temperature does not climb above 70° C. Following complete addition, the reaction mixture is stirred at 60° C. for 6 hours. The free NCO content is then <0.1%. The product is a clear liquid of medium viscosity.

Example 2 (not Inventive): Preparation of a Silane-Modified Polyisocyanate 49.58 weight percent of a solvent-free, isocyanurate-based polyisocyanate based on hexamethylene diisocyanate (VESTANAT HT 2500/100, Evonik Industries) and 0.03% of dibutyltin dilaurate are dissolved in 15 weight percent of Solvesso 100 (aromatic solvent, ExxonMobil) and the solution is heated to 55 to 60° C. under $N_2$. The heating bath is removed and, with stirring, 30.39 weight percent of bis(3-trimethoxysilylpropyl)amine (Dynasylan 1124, Evonik Industries) are added dropwise at a rate such that the temperature is maintained at about 55 to 60° C. After the end of the addition, 5 weight percent of Solvesso 100 are added to the mixture, followed by an hour of stirring at 60° C., and the NCO content is determined. The NCO content is 6.59%. The viscosity, measured at 23° C., is 620 mPas. The arithmetic solids content is 80%.

Example 3: Investigation of the Physical Properties of Various Inventive Coating Materials in Comparison to Conventional Coating Materials The inventive clearcoat materials and also the comparative based on a silane-modified polyisocyanate as per Example 2 (composition III) and a 2-component PU clearcoat material (composition VIII) were formulated in accordance with the amounts shown in Table 1.

TABLE 1

| | | Composition of the inventive coating materials | | | | | |
|---|---|---|---|---|---|---|---|
| Item | | III (partly silanized, comparative) | IV | V | VI | VII | VIII (comparative, 2-component PU) |
| 1 | VESTANAT HT 2500 L (90% form) | / | 18.30 | 16.68 | 15.32 | 12.72 | 19.24 |
| 2 | Isocyanatosilane adduct from Example 1 | / | 4.87 | 13.32 | 20.39 | 33.88 | / |
| 3 | Non-inventive, silane-modified polyisocyanate from Example 2 | 36.43 | / | / | / | / | / |
| 4 | Setalux ® C1767 VV-65 (65% form) | 34.98 | 47.81 | 43.16 | 39.32 | 31.74 | 52.20 |
| 5 | Byketol ® special | 2.60 | 2.60 | 2.60 | 2.60 | 2.60 | 2.60 |

TABLE 1-continued

Composition of the inventive coating materials

| Item | | III (partly silanized, comparative) | IV | V | VI | VII | VIII (comparative, 2-component PU) |
|---|---|---|---|---|---|---|---|
| 6 | Byk ® 301 | 0.20 | 0.20 | 0.20 | 0.20 | 0.20 | 0.20 |
| 7 | Butyl acetate/xylene mixture (1:1) | 22.22 | 20.69 | 18.01 | 15.76 | 11.46 | 22.24 |
| 8 | TEAB (10% in Setalux C1767 VV-65) | 0.06 | 1.85 | 2.08 | 2.23 | 2.78 | / |
| 9 | Tinuvin ® 292 | 0.26 | 0.27 | 0.29 | 0.31 | 0.34 | 0.26 |
| 10 | Tinuvin ® 900 | 3.25 | 3.41 | 3.66 | 3.87 | 4.28 | 3.26 |
| Solids content: (arithmetic, incl. trimethoxysilyl content) | | 51.9 | 53.5 | 57.6 | 61.0 | 67.6 | 51.3 |
| Arithmetic silicon content based on solids [wt %] | | 3.5 | 0.9 | 2.3 | 3.3 | 4.9 | 0.0 |

Setalux ® 1767 VV-65: Polyacrylate polyol, Nuplex Resins B.V.
Byk ® 301: Polyether-modified polydimethylpolysiloxane, flow control agent, Byk Chemie
Byketol ® Special: Flow control agent based on high-boiling solvents and polyether-modified polydimethylsiloxanes, Byk Chemie
Tinuvin ® 292: sterically hindered amine, light stabilizer; BASF SE
Tinuvin ® 900: UV absorber; BASF SE All of the clearcoat materials were formulated as 2-component systems, meaning that the curing component and the polyol component were mixed immediately prior to processing. Here, in the case of the inventive formulations (compositions IV-VII), the silane adduct (item 2) was mixed beforehand with the polyisocyanate (item 1).

The viscosity of the formulations, determined as the flow time in the DIN 4 cup at 23° C., was approximately 20 seconds.

The mechanical characteristics were determined by applying all of the coating materials by spraying with compressed air assistance, using an HPLV gun, to phosphatized steel panels (Chemetall Gardobond 26S/60/OC) and curing them at 140° C. for a time of 22 minutes.

Testing for acid resistance and scratch resistance took place in a two-coat system, the clearcoat over a black basecoat. For this purpose, an aqueous black basecoat material (Autowave MM 245, jet black; blended 100:5 with Aktivator WB, curing: 15' 50° C.) was applied by spraying to—in the case of acid resistance—metal test panels of special deep-drawn material with RP surface to DIN 1624, 570×98×0.8 mm, and—in the case of scratch resistance—to metal bodywork panels (steel, 190×105×0.8 mm DIN 1624) and, after a flash-off time of 10 minutes at room temperature, were dried in a forced air oven at 80° C. for 10 minutes. The dry film thickness in each case is about 10 μm.

For the test for scratch resistance, a nylon fabric 45 mm×20 mm with a mesh size of 25 μm is weighted with a 2 kg weight, and placed on and locked to the test plate, which is in turn fixed on a carriage. Following application of 1 ml of an agitated, 0.25% strength detergent solution (Persil) immediately in front of the test area, the test plate is oscillated with a maximum deflection in each case of about 3.5 cm. After 80 double rubs (1 s$^{-1}$), the remaining wash fluid is rinsed off with mains water and dried with compressed air. Gloss measurements (20° angle) are performed before and after the test in each case.

Recovery (reflow) under effect of temperature: The damaged test plate is stored in a forced air oven at 40° C. for 2 h, after which the gloss of the coating is measured again.

For the acid resistance test, drops (about 0.05 ml) of a 20% strength sulphuric acid solution are applied at a distance of 2 cm, using a pipette, to the metal test plates. In a temperature gradient oven (BYK-Gardner), they are subjected to a temperature gradient, in the longitudinal direction of the plate, from 35 to 80° C. for 30 minutes. Water is then used to wash off residues of the acid, and a visual examination is made after 24 hours. To assess the resistance, the range (temperature) of a first visible attack on the clearcoat, and also the range (temperature) of destruction of the basecoats, in ° C., are reported. The higher the respective temperature, the higher the evaluation of the resistance of the clearcoat.

TABLE 2

Properties of the coatings

| | Example No. | | | | | |
|---|---|---|---|---|---|---|
| | III (comparative) | IV | V | VI | VII | VIII (2-component PU, comparative) |
| Curing | 22' 140° C. | 22' 140° C. | 22' 140° C. | 22' 140° C. | 22' 140° C. | 22' 140° C. |
| Cupping (EN ISO 1520) [mm] | 5.5 | 8.5 | 7.0 | 6.0 | 7.0 | 8 |
| Pendulum hardness (König, DIN EN ISO 1522) [s], after 7 d | 166 | 174 | 164 | 162 | 143 | 171 |

TABLE 2-continued

Properties of the coatings

| | Example No. | | | | | |
|---|---|---|---|---|---|---|
| | III (comparative) | IV | V | VI | VII | VIII (2-component PU, comparative) |
| Ball impact [in lbs] (DIN-EN-ISO 6272-1) | 80 | >80 | >80 | >80 | 80 | 80 |
| MEK test [ASTM D 4752] (Double rubs, 1 kg applied weight) | >150 | >150 | >150 | >150 | >150 | >150 |
| Acid resistance; gradient oven method [° C.] 1st Attack/ destruction of clearcoat | <37/61° C. | 47/67° C. | 43/61° C. | 40/61° C. | 46/71° C. | 47/65° C. |
| Scratch resistance Initial gloss/loss of gloss [scale divisions] | 82/1 | 80/16 | 82/11 | 81/5 | 79/2 | 79/20 |

The results in Table 2 demonstrate that the inventive coating materials, especially at relatively high levels of component C) (compositions with numbers VI, VII) exhibit outstanding scratch resistance, matching the relevant comparative based on trialkoxysilane-modified polyisocyanate crosslinkers (composition III) and being far superior to the 2-component PU coatings in this respect. The chemical resistance of the inventive coatings is significantly superior to that of the scratch-resistant clearcoat in the comparative example (composition III), expressed as acid resistance, and particularly so in relation to the temperature of the first discernible attack by sulphuric acid. Furthermore, Table 1 shows that the solids contents of the inventive coating composition (Examples IV-VII), especially those with outstanding scratch resistance (Examples VI and VII), are significantly increased relative to the scratch-resistant comparative system (Example III).

The invention claimed is:

1. A coating material, comprising:
   an aliphatic or cycloaliphatic polyisocyanate having an NCO functionality of at least 2,
   optionally, a binder,
   an adduct of an isocyanatotrialkoxysilane and a polyhydric alcohol,
      wherein more than 99 percent of the hydroxyl groups in the polyhydric alcohol have been converted by reaction with the isocyanatotrialkoxysilane, and less than 0.1 wt % of the isocyanate groups from the isocyanatotrialkoxysilane are reactive in the adduct,
   a catalyst selected from the group consisting of a Lewis acid, phosphoric acid, phosphorous acid and an ester thereof, blocked or non-blocked sulphonic acids, sulphuric acid, carboxylic acids having a melting point >60° C. and tetraalkylammonium carboxylates,
   optionally, an auxiliary selected from the group consisting of an isocyanate-free crosslinker, an additive, a stabilizer and an adjuvant, and
   optionally, an organic solvent.

2. The coating material according to claim 1, wherein the fraction of the aliphatic or cycloaliphatic polyisocyanate, based on the sum of the aliphatic or cycloaliphatic polyisocyanate, the binder and the adduct is 15 to 40 weight percent.

3. The coating material according to claim 1, wherein the fraction of the binder, based on the sum of the aliphatic or cycloaliphatic polyisocyanate, the binder and the adduct is 20 to 60 weight percent.

4. The coating material according to claim 1, wherein the fraction of the adduct, based on the sum of the aliphatic or cycloaliphatic polyisocyanate, the binder and the adduct is 10 to 70 weight percent.

5. The coating material according to claim 1, wherein the aliphatic or cycloaliphatic polyisocyanate is prepared by oligomerization of a diisocyanate.

6. The coating material according to claim 1, which contains the binder, and wherein the binder is selected from the group consisting of a hydroxyl-containing polyester, a hydroxyl containing polyether, a hydroxyl-containing polyacrylate, a hydroxyl-containing polyurethane and mixtures thereof, and
   wherein the binder has an OH number of 20 to 500 mg KOH/g.

7. The coating material according to claim 1, wherein the adduct of an isocyanatotrialkoxysilane and polyhydric alcohol is an adduct from the reaction of an isocyanatotrialkoxysilane, which represents an alkyl radical substituted by at least one $Si(OR_1)(OR_2)(OR_3)$ group and an isocyanate group, and a polyhydric alcohol,
   wherein the alkyl radical substituted by the at least one $Si(OR_1)(OR_2)(OR_3)$ group and an isocyanate group is a linear or branched alkane comprising 1 to 4 carbon atoms,
   and wherein $R_1$, $R_2$ and $R_3$, in each case and independently of one another, are selected from the group consisting of methyl, ethyl, propyl and butyl.

8. The coating material according to claim 7, wherein the isocyanatotrialkoxysilane is a compound of the formula (I), $$OCN-(CH_2)_n-Si(OR_1)(OR_2)(OR_3) \qquad (I),$$

wherein
   n is 1, 2, 3, 4, 5 or 6, and
   $R_1$, $R_2$ and $R_3$, in each case and independently of one another, are selected from the group consisting of methyl, ethyl and propyl.

9. The coating material according to claim 1, wherein the polyhydric alcohol in the adduct is a non-cyclic polyhydric alcohol to an extent of at least 75%.

10. A process of coating a surface, comprising:
(1) applying the coating material of claim 1 to a surface, and
(2) curing the coating material.

11. The process according to claim 10, wherein curing the coating material is carried out at a temperature of 10 to 200° C.

12. A coating obtained by the process according to claim 10.

13. The coating material according to claim 1, which consists essentially of:
the aliphatic or cycloaliphatic polyisocyanate,
optionally, the binder,
the adduct of an isocyanatotrialkoxysilane and a polyhydric alcohol,
the catalyst,
optionally, the auxiliary, and
optionally, the organic solvent.

14. The coating material according to claim 1, which consists of:
the aliphatic or cycloaliphatic polyisocyanate,
optionally, the binder,
the adduct of an isocyanatotrialkoxysilane and a polyhydric alcohol,
the catalyst,
optionally, the auxiliary, and
optionally, the organic solvent.

15. The coating material according to claim 1, wherein the catalyst consists of a component selected from the group consisting of a Lewis acid, phosphoric acid, phosphorous acid and an ester thereof, blocked or non-blocked sulphonic acids, sulphuric acid, carboxylic acids having a melting point >60° C., tetraalkylammonium carboxylates, and mixtures thereof.

16. The coating material according to claim 1, wherein the catalyst consists of (1) a first component selected from the group consisting of a Lewis acid, phosphoric acid, phosphorous acid and an ester thereof, blocked or non-blocked sulphonic acids, sulphuric acid, carboxylic acids having a melting point >60° C., tetraalkylammonium carboxylates, and mixtures thereof, and, optionally, (2) a second component selected from the group consisting of metal complexes with chelate ligands, aluminium, zirconium, titanium and/or boron alkoxides and/or esters thereof, organic Sn(IV), Sn(II), Zn and Bi compounds, substituted phosphonic diesters and diphosphonic diesters, amine-blocked phosphoric esters, amine-blocked phosphoric acid catalysts, amine-blocked partial esters of phosphoric acid, and mixtures thereof.

17. The coating material according to claim 1, which comprises
15 to 40 weight percent of the aliphatic or cycloaliphatic polyisocyanate having an NCO functionality of at least 2,
20 to 60 weight percent of the binder, and
10 to 70 weight percent of the adduct of an isocyanatotrialkoxysilane and a polyhydric alcohol,
based on the total weight of the aliphatic or cycloaliphatic polyisocyanate having an NCO functionality of at least 2, the binder and the adduct of an isocyanatotrialkoxysilane and a polyhydric alcohol.

18. The coating material according to claim 1, which has a water content of at most 3 weight percent.

* * * * *